United States Patent
Gao et al.

(10) Patent No.: US 12,355,593 B2
(45) Date of Patent: Jul. 8, 2025

(54) COMMUNICATION METHOD AND APPARATUS

(71) Applicant: HUAWEI TECHNOLOGIES CO., LTD., Guangdong (CN)

(72) Inventors: Xinyu Gao, Beijing (CN); Xiang Gao, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 214 days.

(21) Appl. No.: 18/321,223

(22) Filed: May 22, 2023

(65) Prior Publication Data

US 2023/0291613 A1    Sep. 14, 2023

Related U.S. Application Data

(63) Continuation of application No. PCT/CN2020/132415, filed on Nov. 27, 2020.

(51) Int. Cl.
*H04L 25/02* (2006.01)
*H04L 5/00* (2006.01)

(52) U.S. Cl.
CPC ........ *H04L 25/0242* (2013.01); *H04L 5/0051* (2013.01)

(58) Field of Classification Search
CPC . H04L 25/0242; H04L 5/0051; H04L 1/0001; H04L 25/0226; H04B 7/0456; H04B 7/0417

See application file for complete search history.

(56) References Cited

U.S. PATENT DOCUMENTS

| 2018/0091197 A1 | 3/2018 | Huang et al. |
| 2018/0167183 A1 | 6/2018 | Zhang et al. |
| 2020/0091975 A1* | 3/2020 | Park .................. H04L 5/00 |

FOREIGN PATENT DOCUMENTS

| CN | 109450509 A | 3/2019 |
| CN | 109792269 A | 5/2019 |

(Continued)

OTHER PUBLICATIONS

International Search Report and Written Opinion in International Appln. No. PCT/CN2020/132415, mailed on Jun. 23, 2021, 19 pages (with English translation).

(Continued)

*Primary Examiner* — Vineeta S Panwalkar
(74) *Attorney, Agent, or Firm* — Fish & Richardson P.C.

(57) ABSTRACT

Example communication methods and apparatus are described. One example method includes receiving a reference signal from a network device by a terminal device. The reference signal has an association relationship with a weight matrix and a channel between the network device and the terminal device, a quantity of rows or columns of the weight matrix is N, and N is a positive integer less than or equal to a quantity of receive ports of the terminal device. The terminal device determines an estimation result of the weight matrix based on the reference signal, where the estimation result of the weight matrix is used by the terminal device to perform signal detection on a data signal received by the terminal device from the network device, or is used by the terminal device to precode a data signal sent by the terminal device to the network device.

20 Claims, 7 Drawing Sheets

(56) References Cited

FOREIGN PATENT DOCUMENTS

| EP | 2866358 A1 | 4/2015 |
| EP | 3535860 B1 | 3/2022 |
| WO | 2018023221 A1 | 2/2018 |
| WO | 2018031367 A1 | 2/2018 |
| WO | 2020247302 A1 | 12/2020 |

OTHER PUBLICATIONS

Extended European Search Report in European Appln No. 20962946.8, dated Nov. 7, 2023, 8 pages.

* cited by examiner

COMMUNICATION METHOD AND APPARATUS

CROSS-REFERENCE TO RELATED APPLICATIONS

This application is a continuation of International Application No. PCT/CN2020/132415, filed on Nov. 27, 2020, the disclosure of which is hereby incorporated by reference in its entirety.

TECHNICAL FIELD

Embodiments of this application relate to the field of communication technologies, and in particular, to a communication method and apparatus.

BACKGROUND

In a multiple-input multiple-output (MIMO) system, a network device (for example, a base station) may estimate uplink channel information by using a sounding reference signal (SRS) received by the network device from a terminal device. Subsequently, the base station may estimate downlink channel information based on the uplink channel information and reciprocity between uplink and downlink channels in a time division duplex (TDD) mode.

During uplink data transmission, the network device may design a precoding matrix of the terminal device based on the uplink channel information, and deliver precoding matrix information to the terminal device. Then, the terminal device precodes an uplink data signal based on the precoding matrix information, to pre-eliminate interference between uplink data streams, so that the network device receives an uplink data signal without interference between data streams. However, delivering the precoding matrix information usually causes high signaling overheads, especially when the precoding matrix is at a subband level or even at an RB (resource block) level (to be specific, the network device needs to deliver a precoding matrix of the terminal device on each subband or even on each RB to the terminal device).

Correspondingly, during downlink data transmission, the network device designs precoding of the network device based on the downlink channel information to perform downlink data transmission, to pre-eliminate interference between downlink data streams, so that the terminal device receives a downlink data signal without interference between data streams. However, in the foregoing process of eliminating the interference between downlink data streams by using precoding of the network device, transmit power of the network device may be lost, and consequently, a received signal to noise indicator of the terminal device is reduced. To resolve this problem, a feasible technology is to effectively superimpose an interference signal between data streams and a data signal through symbol-level precoding (SLP), so that the terminal device can more accurately restore a data signal sent by the network device. As shown in a quadrature phase shift keying (QPSK) constellation diagram in FIG. 1, it is assumed that a data signal transmitted by a network device is OA. If a conventional precoding scheme is used, interference between data streams may be eliminated, so that a data signal received by a terminal device is exactly OA. If symbol-level precoding SLP is used, an interference signal between data streams may be adjusted to AB, so that a data signal received by the terminal device is OB. Compared with the data signal OA, the data signal OB is farther away from a decision threshold of a QPSK constellation (that is, the foregoing effective superimposition). Therefore, the symbol-level precoding SLP has better anti-noise performance. In other words, the symbol-level precoding SLP may equivalently implement constellation point extension in the QPSK constellation diagram, to improve a received signal to noise indicator of the terminal device. However, in the symbol-level precoding SLP, to implement effective superimposition of an interference signal and a data signal, the network device needs to know a detection matrix used by the terminal device to detect the data signal. Therefore, the network device usually needs to determine the detection matrix, and deliver the detection matrix to the terminal device. However, delivering detection matrix information also causes high signaling overheads, especially when a precoding matrix is at a subband level or even at an RB level.

In conclusion, in both an uplink data transmission process and a downlink data transmission process, the network device may need to deliver a weight matrix (where uplink corresponds to the precoding matrix of the terminal device, and downlink corresponds to the detection matrix of the terminal device) to the terminal device. This delivery process usually causes high signaling overheads.

SUMMARY

This application provides a communication method and apparatus. A terminal device may determine an estimation result of a weight matrix U based on a reference signal received by the terminal device, so that the terminal device can perform downlink data signal detection or uplink data signal precoding based on the estimation result of the weight matrix U. Therefore, signaling overheads used during data transmission between the network device and the terminal device are reduced.

To achieve the foregoing objective, the following technical solutions are used in this application.

According to a first aspect, this application provides a communication method. The method may include: A terminal device receives a reference signal sent by a network device. The reference signal has an association relationship with a weight matrix U and a channel between the network device and the terminal device. A quantity of rows or columns of the weight matrix U is N, and N is a positive integer less than or equal to a quantity of receive ports of the terminal device. Then, the terminal device determines an estimation result of the weight matrix U based on the received reference signal. The estimation result of the weight matrix U is used by the terminal device to perform signal detection on a data signal received by the terminal device from the network device, or the estimation result of the weight matrix U is used by the terminal device to precode a data signal sent by the terminal device to the network device. Because the reference signal has an association relationship with the weight matrix U and the channel between the network device and the terminal device, the terminal device determines the estimation result of the corresponding weight matrix U based on the reference signal, so that the terminal device performs signal detection, precoding, or the like on a data signal by using the estimation result of the weight matrix U. In other words, in a data transmission process, the network device does not need to send the weight matrix U of the terminal device to the terminal device by using additional signaling. Therefore, signaling overheads used during data transmission between the terminal device and the network device are reduced.

In a possible implementation, that the estimation result of the weight matrix U is used by the terminal device to perform signal detection on a data signal received by the terminal device from the network device includes: The terminal device multiplies the estimation result of the weight matrix U by the data signal received by the terminal device from the network device, to perform signal detection. In conclusion, the terminal device can implement signal detection on the data signal based on the estimation result of the weight matrix U, and restore the data signal received from the network device.

In a possible implementation, that the estimation result of the weight matrix U is used by the terminal device to precode a data signal sent by the terminal device to the network device includes: The terminal device multiplies the estimation result of the weight matrix U by the data signal sent by the terminal device to the network device, to perform precoding. In conclusion, the terminal device can precode the data signal based on the estimation result of the weight matrix U, and determine a precoded data signal sent to the network device.

In a possible implementation, the method further includes: The terminal device receives first information sent by the network device. The first information indicates to the terminal device that the estimation result of the weight matrix U is used by the terminal device to perform signal detection on a data signal received by the terminal device from the network device.

In a possible implementation, the method further includes: The terminal device receives first information sent by the network device. The first information indicates to the terminal device that the estimation result of the weight matrix U is used by the terminal device to precode a data signal sent by the terminal device to the network device.

In other words, after receiving the first information from the network device, the terminal device implements, based on an indication of the first information, signal detection of a (downlink) data signal or precoding of an (uplink) data signal by using the estimation result of the weight matrix U obtained by the terminal device based on the reference signal, so that the terminal device restores the data signal received from the network device or the network device restores the data signal received from the terminal device. In addition, in a data transmission process, the terminal device may directly obtain the estimation result of the weight matrix U based on the reference signal received by the terminal device. In other words, the network device does not need to send the weight matrix U of the terminal device to the terminal device by using additional signaling. Therefore, in the foregoing process, signaling overheads used during data transmission between the terminal device and the network device can be reduced.

In a possible implementation, that the reference signal has an association relationship with a weight matrix U and a channel between the network device and the terminal device specifically includes: The reference signal is determined by a matrix $P=\alpha H^H(HH^H)^{-1} U$. H represents the channel between the network device and the terminal device, $H^H$ represents a conjugate transpose of H, and $\alpha$ is a real number.

In a possible implementation, that the reference signal has an association relationship with a weight matrix U and a channel between the network device and the terminal device specifically includes: The reference signal is determined by a matrix $P=\alpha H^H(HH^H)^{-1}(1\otimes U)$ or $P=\alpha H^H(HH^H)^{-1}(U\otimes 1)$. H indicates the channel between the network device and the terminal device, $H^H$ indicates a conjugate transpose of H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

In a possible implementation, $\alpha$ has an association relationship with transmit power of the network device.

In a possible implementation, the method further includes: The terminal device receives second information sent by the network device. The second information indicates $\alpha$. In the foregoing process, the terminal device may determine $\alpha$ based on the second information sent by the network device, and determine the estimation result of the weight matrix U based on $\alpha$ and the association relationship between the reference signal and the weight matrix U and the channel between the network device and the terminal device, so that the terminal device restores the data signal received from the network device or the network device restores the data signal received from the terminal device.

In a possible implementation, the terminal device receives third information sent by the network device. The third information indicates, to the terminal device, the association relationship between the reference signal and the weight matrix U, to be specific, the association relationship between the reference signal and the weight matrix U and the channel between the network device and the terminal device. In the foregoing process, after receiving the third information sent by the network device, the terminal device may obtain the association relationship between the reference signal and the weight matrix U indicated by the third information, and then obtain, based on the association relationship, the estimation result of the weight matrix U based on the reference signal after receiving the reference signal sent by the network device.

According to a second aspect, this application provides a communication method. The method includes: A network device sends a reference signal to a network device. The reference signal has an association relationship with a weight matrix U and a channel between the network device and the terminal device. A quantity of rows or columns of the weight matrix U is N, and N is a positive integer less than or equal to a quantity of receive ports of the terminal device. The reference signal is used by the terminal device to determine an estimation result of the weight matrix U. The estimation result of the weight matrix U is used by the terminal device to perform signal detection on a data signal received by the terminal device from the network device, or the estimation result of the weight matrix U is used by the terminal device to precode a data signal sent by the terminal device to the network device. After the network device sends the reference signal to the terminal device, because the reference signal has an association relationship with the weight matrix U and the channel between the network device and the terminal device, the terminal device determines the estimation result of the corresponding weight matrix U based on the reference signal after receiving the reference signal, so that the terminal device performs signal detection, precoding, or the like on a data signal by using the estimation result of the weight matrix U. In other words, in a data transmission process, the network device does not need to send information about the weight matrix U of the terminal device to the terminal device by using additional signaling. Therefore, signaling overheads used during data transmission between the terminal device and the network device are reduced.

In a possible implementation, the method further includes: The network device sends first information to the terminal device. The first information indicates to the terminal device that the estimation result of the weight matrix U is used by the terminal device to perform signal detection on a data signal received by the terminal device from the network device.

In a possible implementation, the method further includes: The network device sends first information to the terminal device. The first information indicates to the terminal device that the estimation result of the weight matrix U is used by the terminal device to precode a data signal sent by the terminal device to the network device.

In conclusion, after the network device sends the first information to the terminal device, the terminal device may implement, based on an indication of the first information, signal detection of a (downlink) data signal or precoding of an (uplink) data signal by using the estimation result of the weight matrix U obtained by the terminal device based on the reference signal, so that the terminal device restores the data signal received from the network device or the network device restores the data signal received from the terminal device. In addition, in a data transmission process between the terminal device and the network device, the terminal device may directly obtain the estimation result of the weight matrix U based on the reference signal. In other words, the network device does not need to send the weight matrix U of the terminal device to the terminal device by using additional signaling. Therefore, in the foregoing process, signaling overheads used during data transmission between the terminal device and the network device can be reduced.

In a possible implementation, that the reference signal has an association relationship with a weight matrix U and a channel between the network device and the terminal device specifically includes: The reference signal is determined by a matrix $P=\alpha H^H(HH^H)^{-1}$ U. H represents the channel between the network device and the terminal device, $H^H$ represents a conjugate transpose of H, and $\alpha$ is a real number.

In a possible implementation, that the reference signal has an association relationship with a weight matrix U and a channel between the network device and the terminal device specifically includes: The reference signal is determined by a matrix $P=\alpha H^H(HH^H)^{-1}(1 \otimes U)$ or $P=\alpha H^H(HH^H)^{-1}(U \otimes 1)$. H indicates the channel between the network device and the terminal device, $H^H$ indicates a conjugate transpose of H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

$\alpha$ has an association relationship with transmit power of the network device.

In a possible implementation, the network device sends second information to the terminal device. The second information indicates $\alpha$. In the foregoing process, after the network device sends the second information to the terminal device, the terminal device may determine $\alpha$ based on an indication of the second information sent by the network device, and determine the estimation result of the weight matrix U based on $\alpha$ and the association relationship between the reference signal and the weight matrix U and the channel between the network device and the terminal device, so that the terminal device restores the data signal received from the network device or the network device restores the data signal received from the terminal device.

In a possible implementation, the network device sends third information to the terminal device. The third information indicates, to the terminal device, the association relationship between the reference signal and the weight matrix U, to be specific, the association relationship between the reference signal and the weight matrix U and the channel between the network device and the terminal device. In the foregoing process, after the network device sends the third information to the terminal device, the terminal device may obtain the association relationship between the reference signal and the weight matrix U based on the indication of the third information, and then obtain, based on the association relationship, the estimation result of the weight matrix U based on the reference signal after receiving the reference signal sent by the network device.

According to a third aspect, this application provides a communication apparatus, configured to implement the communication method described in the first aspect. The communication apparatus may be deployed in a terminal device. In other words, the communication apparatus may be the terminal device or an apparatus that supports the terminal device in implementing the method described in the first aspect. The communication apparatus includes a receiving unit and an estimation unit. The receiving unit is configured for the terminal device to receive a reference signal sent by a network device. The reference signal has an association relationship with a weight matrix U and a channel between the network device and the terminal device. A quantity of rows or columns of the weight matrix U is N, and N is a positive integer less than or equal to a quantity of receive ports of the terminal device. Then, the estimation unit is configured to determine an estimation result of the weight matrix U based on the reference signal received by the receiving unit. The estimation result of the weight matrix U is used by the terminal device to perform signal detection on a data signal received by the terminal device from the network device, or the estimation result of the weight matrix U is used by the terminal device to precode a data signal sent by the terminal device to the network device.

In a possible implementation, the communication apparatus further includes a signal detection unit. The signal detection unit is configured to multiply the estimation result of the weight matrix U by the data signal received by the terminal device from the network device, to perform signal detection.

In a possible implementation, the communication apparatus further includes a precoding unit. The precoding unit is configured to multiply the estimation result of the weight matrix U by the data signal sent by the terminal device to the network device, to perform precoding.

In a possible implementation, the receiving unit is further configured to receive first information sent by the network device. The first information indicates to the terminal device that the estimation result of the weight matrix U is used by the terminal device to perform signal detection on a data signal received by the terminal device from the network device.

In a possible implementation, the receiving unit is further configured to receive first information sent by the network device. The first information indicates to the terminal device that the estimation result of the weight matrix U is used by the terminal device to precode a data signal sent by the terminal device to the network device.

In a possible implementation, that the reference signal has an association relationship with a weight matrix U and a channel between the network device and the terminal device specifically includes: The reference signal is determined by a matrix $P=\alpha H^H(HH^H)^{-1}$ U. H represents the channel between the network device and the terminal device, $H^H$ represents a conjugate transpose of H, and $\alpha$ is a real number.

In a possible implementation, that the reference signal has an association relationship with a weight matrix U and a channel between the network device and the terminal device specifically includes: The reference signal is determined by a matrix $P=\alpha H^H(HH^H)^{-1}(1 \otimes U)$ or $P=\alpha H^H(HH^H)^{-1}(U \ominus 1)$. H indicates the channel between the network device and the terminal device, $H^H$ indicates a conjugate transpose of H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

$\alpha$ has an association relationship with transmit power of the network device.

In a possible implementation, the receiving unit is further configured to receive second information sent by the network device. The second information indicates $\alpha$.

In a possible implementation, the receiving unit is further configured to receive third information sent by the network device. The third information indicates, to the terminal device, the association relationship between the reference signal and the weight matrix U, to be specific, the association relationship between the reference signal and the weight matrix U and the channel between the network device and the terminal device.

According to a fourth aspect, this application provides a communication apparatus, configured to implement the method described in the second aspect. The communication apparatus may be deployed in a network device. In other words, the communication apparatus may be the network device or an apparatus that supports the network device in implementing the method described in the second aspect. The communication apparatus includes a sending unit. The sending unit is configured to send a reference signal to the terminal device. The reference signal has an association relationship with a weight matrix U and a channel between the network device and the terminal device. A quantity of rows or columns of the weight matrix U is N, and N is a positive integer less than or equal to a quantity of receive ports of the terminal device. The reference signal is used by the terminal device to determine an estimation result of the weight matrix U. The estimation result of the weight matrix U is used by the terminal device to perform signal detection on a data signal received by the terminal device from the network device, or the estimation result of the weight matrix U is used by the terminal device to precode a data signal sent by the terminal device to the network device.

In a possible implementation, the sending unit is further configured to send first information to the terminal device. The first information indicates to the terminal device that the estimation result of the weight matrix U is used by the terminal device to perform signal detection on a data signal received by the terminal device from the network device.

In a possible implementation, the sending unit is configured to send first information to the terminal device. The first information indicates to the terminal device that the estimation result of the weight matrix U is used by the terminal device to precode a data signal sent by the terminal device to the network device.

In a possible implementation, that the reference signal has an association relationship with a weight matrix U and a channel between the network device and the terminal device specifically includes: The reference signal is determined by a matrix $P=\alpha H^H(HH^H)^{-1}$ U. H represents the channel between the network device and the terminal device, $H^H$ represents a conjugate transpose of H, and $\alpha$ is a real number.

In a possible implementation, that the reference signal has an association relationship with a weight matrix U and a channel between the network device and the terminal device specifically includes: The reference signal is determined by a matrix $P=\alpha H^H(HH^H)^{-1}(1 \otimes U)$ or $P=\alpha H^H(HH^H)^{-1}(U \ominus 1)$. H indicates the channel between the network device and the terminal device, $H^H$ indicates a conjugate transpose of H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

$\alpha$ has an association relationship with transmit power of the network device.

In a possible implementation, the sending unit is further configured to send second information to the terminal device. The second information indicates $\alpha$.

In a possible implementation, the sending unit is further configured to send third information to the terminal device. The third information indicates the association relationship between the reference signal and the weight matrix U to the terminal device.

According to a fifth aspect, this application provides a communication apparatus, including a processor. The processor is coupled to a memory. Optionally, the apparatus further includes at least one communication interface and a communication bus. The memory is configured to store computer-executable instructions. The processor, the memory, and the at least one communication interface are connected through the communication bus. The processor executes the computer-executable instructions stored in the memory, to enable the communication apparatus to implement any communication method provided in the first aspect or the second aspect. The apparatus may exist in a form of a chip product.

According to a sixth aspect, this application provides a communication system, including the communication apparatuses provided in the third aspect and the fourth aspect.

According to a seventh aspect, a computer-readable storage medium is provided. The storage medium includes instructions. When the instructions are run on a computer, the computer is enabled to perform the communication method provided in any one of the possible implementations of the first aspect or the second aspect.

According to an eighth aspect, a computer program product including instructions is provided. When the computer program product runs on a computer, the computer is enabled to perform the communication method provided in any one of the possible implementations of the first aspect or the second aspect.

According to a ninth aspect, an embodiment of this application provides a chip. The chip includes a processor and an interface. The processor is coupled to a memory through the interface. When the processor executes a computer program or instructions in the memory, the communication method provided in any one of the possible implementations of the first aspect or the second aspect is performed.

In the foregoing aspects, for beneficial effects of the apparatuses corresponding to the methods, refer to the beneficial effects of the corresponding methods. Details are not described again. It should be noted that, various possible implementations of any one of the foregoing aspects may be combined on a premise that the solutions are not contradictory.

Figure 7:
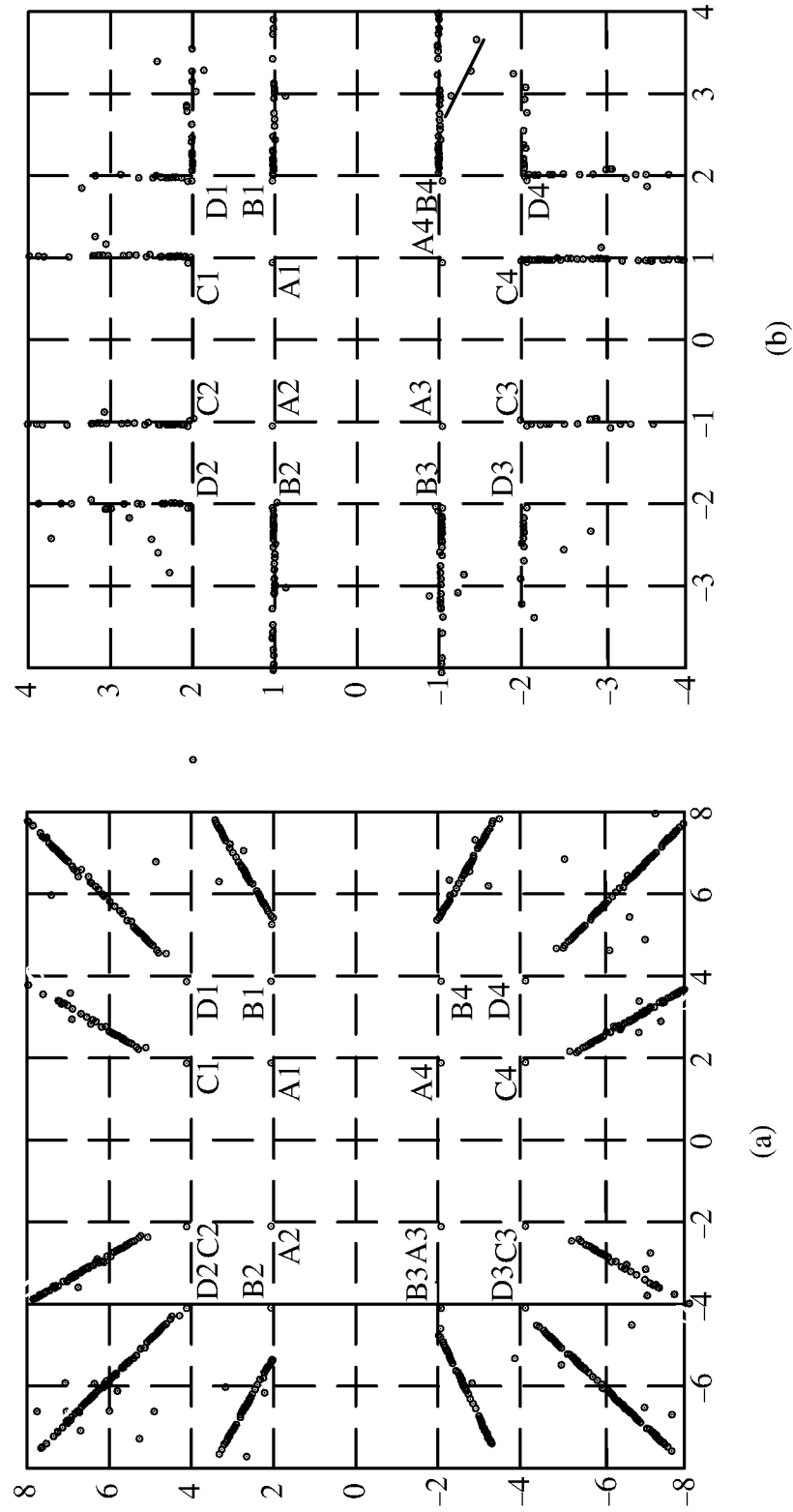
Figure 8:
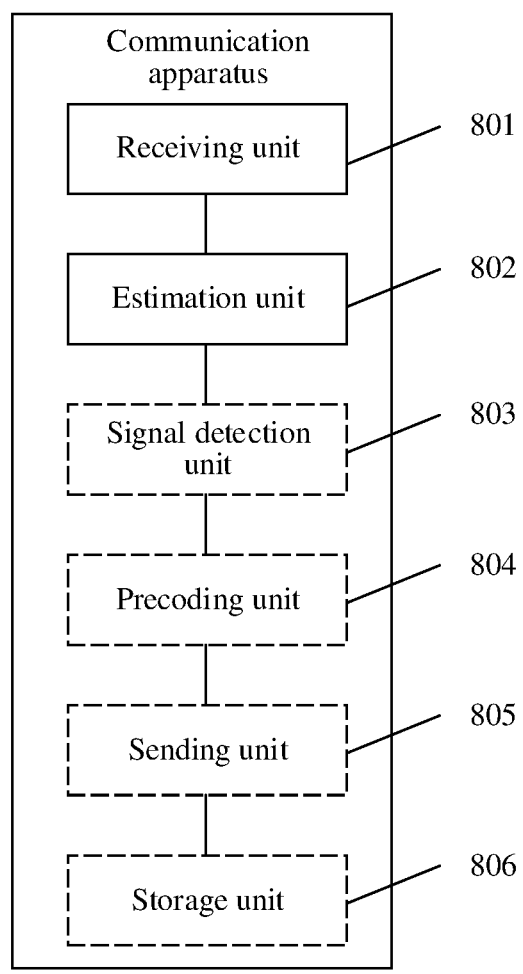
Figure 9:
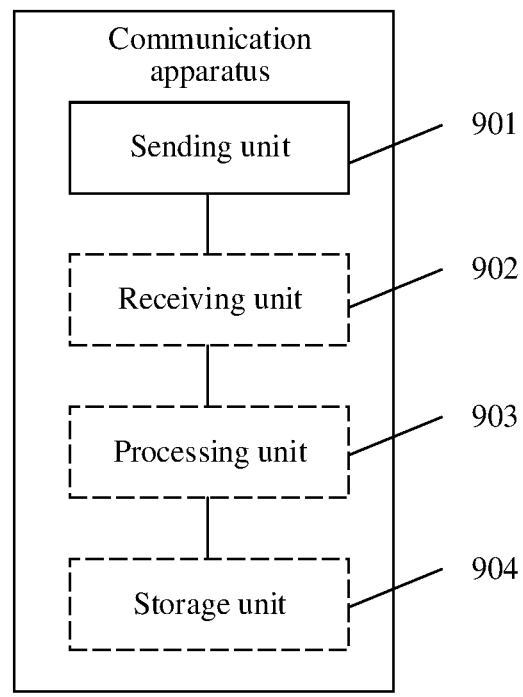
Figure 10:
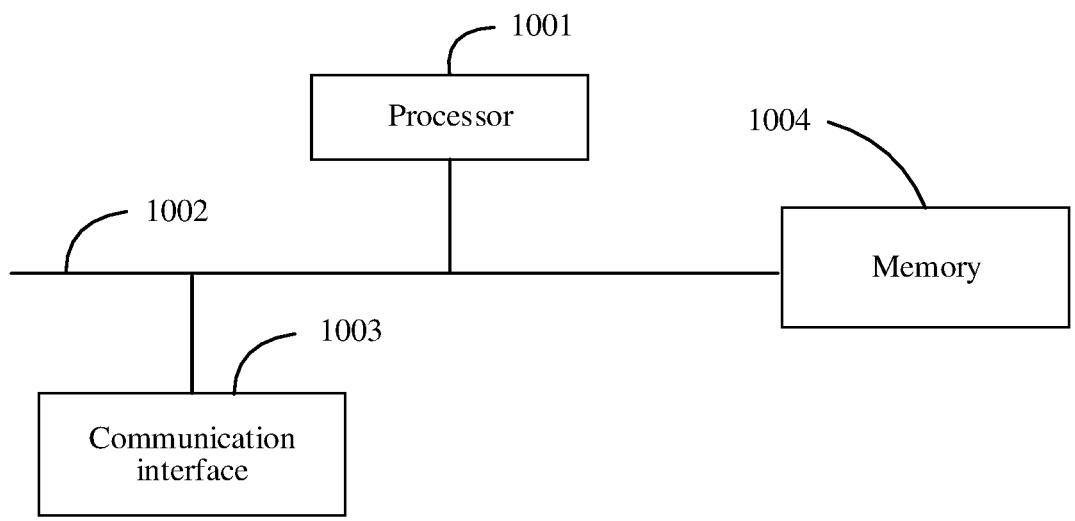

(a) in FIG. 7 is a 16QAM constellation diagram 2 according to this application;

(b) in FIG. 7 is a 16QAM constellation diagram 3 according to this application;

FIG. 8 is a schematic composition diagram 1 of a communication apparatus according to this application;

FIG. 9 is a schematic composition diagram 2 of a communication apparatus according to this application; and FIG. 10 is a diagram of a hardware structure of a communication apparatus according to this application.

DESCRIPTION OF EMBODIMENTS

In descriptions of this application, unless otherwise specified, "I" means "or". For example, AB may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, words "example" or "for example" are used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

This application provides a communication method, to reduce signaling overheads required for a network device to deliver a weight matrix (where uplink corresponds to a precoding matrix of a terminal device, and downlink corresponds to a detection matrix of the terminal device) to the terminal device. The following further describes in detail this application with reference to accompanying drawings. It should be understood that a specific operation method in a method embodiment described below may also be applied to an apparatus embodiment or a system embodiment.

Figure 1:
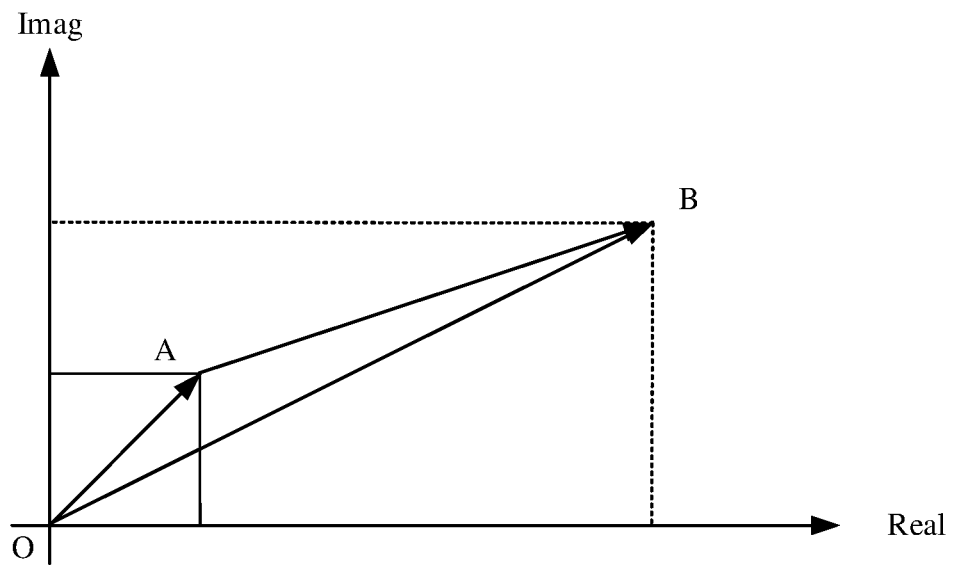
FIG. 1 is a schematic diagram of effective superimposition of a symbol-level precoding data signal and an interference signal according to this application.
Figure 2:
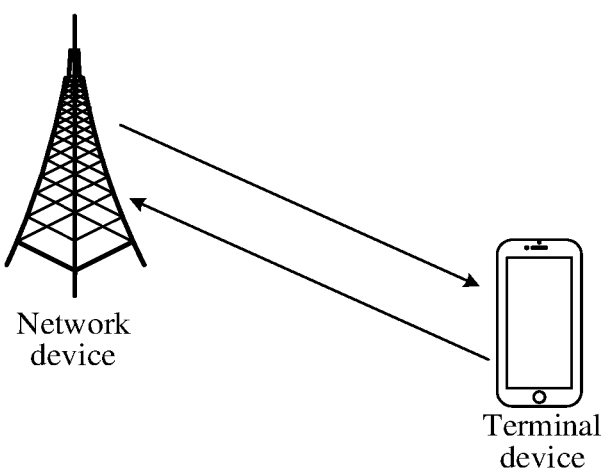
FIG. 2 is a schematic diagram of a communication scenario according to this application.

Network elements in embodiments of this application include a network device and a terminal device in a communication network. For details, refer to FIG. 2.

A communication system in embodiments of this application includes but is not limited to a long term evolution (LTE) system, a 5G system, an NR system, a wireless local area network (WLAN) system, a future evolved system, or a system converging a plurality of communication technologies. For example, a method provided in embodiments of this application may be specifically applied to an evolved-universal terrestrial radio access network (E-UTRAN) and a next generation-radio access network (NG-RAN) system.

A network device in embodiments of this application is a network-side entity configured to send a signal, receive a signal, or send a signal and receive a signal. The network device may be an apparatus that is deployed in a radio access network (RAN) and that provides a wireless communication function for the terminal device. For example, the network device may be a transmission reception point (TRP), a base station, control nodes in various forms, or a road side unit (RSU). The base station may be a macro base station, a micro base station (also referred to as a small cell), a relay station, an access point (AP), or the like in various forms. For example, the base station may be an evolved NodeB (eNB or eNodeB), a next generation node base station (gNB), a next generation eNB (ng-eNB), a relay node (RN), or an integrated access and backhaul (IAB) node. In systems using different radio access technologies (RATs), names of devices having a base station function may be different. For example, the base station may be referred to as an eNB or an eNodeB in an LTE system, and may be referred to as a gNB in a 5G system or an NR system. A specific name of the base station is not limited in this application. The control node may be connected to a plurality of base stations, and configure resources for a plurality of terminal devices covered by the plurality of base stations. For example, the control node may be a network controller or a radio controller (for example, a radio controller in a cloud radio access network (CRAN) scenario). Alternatively, the network device may be an access network device or the like in a future evolved public land mobile network (PLMN).

The terminal device in embodiments of this application may be a user-side entity configured to receive a signal, send a signal, or receive a signal and send a signal. The terminal device is configured to provide one or more of a voice service and a data connectivity service for a user. The terminal device may also be referred to as user equipment (UE), a terminal, an access terminal, a subscriber unit, a subscriber station, a mobile station, a remote station, a remote terminal, a mobile device, a user terminal, a wireless communication device, a user agent, or a user apparatus. The terminal device may be a vehicle-to-everything (V2X) device, for example, a smart car (or intelligent car), a digital car, an unmanned car (driverless car, pilotless car, or automobile), a self-driving car (or autonomous car), a pure electric vehicle (pure EV or Battery EV), a hybrid electric vehicle (HEV), a range extended electric vehicle (REEV), a plug-in hybrid electric vehicle (PHEV), or a new energy vehicle. Alternatively, the terminal device may be a device-to-device (D2D) device, for example, an electricity meter or a water meter. Alternatively, the terminal device may be a mobile station (MS), a subscriber unit, an uncrewed aerial vehicle, an internet of things (IoT) device, a station (ST) in a WLAN, a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal, a handheld device having a wireless communication function, a computing device or another processing device connected to a wireless modem, a vehicle-mounted device, or a wearable device (which may also be referred to as a wearable intelligent device). Alternatively, the terminal device may be a terminal in a next generation communication system, for example, a terminal in a 5G system, a terminal in a future evolved PLMN, or a terminal in an NR system.

A weight matrix U in embodiments of this application is determined by the network device, and is sent by the network device to the terminal device. The weight matrix U may be used by the terminal device to perform signal detection on a (downlink) data signal received by the terminal device, or may be used by the terminal device to precode an (uplink) data signal sent by the terminal device to the network device. In other words, the weight matrix U of the terminal device may be a detection matrix used by the terminal device to detect a (downlink) data signal, or may be a precoding matrix used by the terminal device to precode an (uplink) data signal.

The following describes the foregoing two cases with reference to Embodiment 1 and Embodiment 2:

Embodiment 1

In this embodiment, the weight matrix U of the terminal device is a detection matrix used by the terminal device to detect a data signal. The detection matrix of the terminal device may maximize receive power of the terminal device, to reduce a loss of the receive power of the terminal device. In the symbol-level precoding SLP, to implement effective superimposition of an interference signal and a data signal, the network device needs to know a detection matrix used by the terminal device to detect the data signal. Therefore, the network device usually needs to determine the detection matrix, and send the detection matrix to the terminal device. Because the weight matrix U of the terminal device in this embodiment is the detection matrix used by the terminal device to detect the data signal, the detection matrix is uniformly described as the weight matrix U in the following descriptions of this embodiment. Details are not described again.

In conventional precoding, precoding used for downlink data transmission is the same as precoding used for DMRS transmission, so that the terminal device can restore a precoded data channel based on a DMRS received by the terminal device, to restore, based on the data channel, a data signal received by the terminal device. However, in the symbol-level precoding SLP, a data signal and an interference signal received by the terminal device may be effectively superimposed. Therefore, the data signal does not need to be restored based on an estimation result of the data channel, and a DMRS does not need to carry data channel information. Based on this characteristic, in this embodiment, the DMRS may be used to carry weight matrix information of the terminal device, to reduce signaling overheads required by the network device to deliver the weight matrix information to the terminal device. In other words, in this embodiment of this application, after determining the weight matrix U of the terminal device, the network device uses the DMRS to carry the weight matrix information. It should be noted that the network device may alternatively use another reference signal other than the DMRS to carry the weight matrix information in an actual case.

Figure 3:
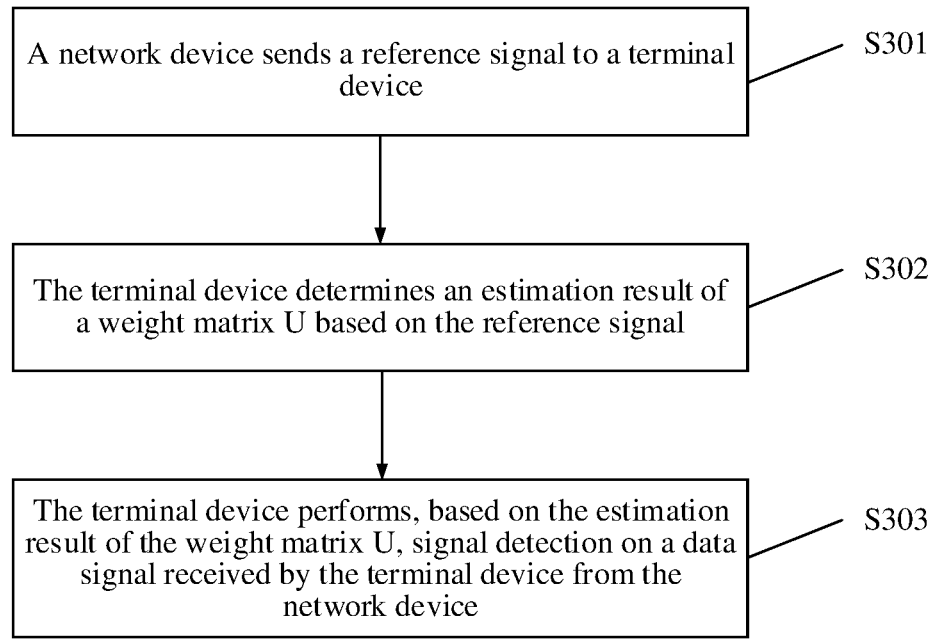
FIG. 3 is a schematic flowchart 1 of a communication method according to this application.

As shown in FIG. 3, the method includes S301 to S303.

S301. A network device sends a reference signal to a terminal device.

Correspondingly, the terminal device receives the reference signal sent by the network device.

For example, the reference signal sent by the network device to the terminal device may be a demodulation reference signal (DMRS).

Information carried in the reference signal may be an orthogonal OCC (orthogonal cover code) sequence, a ZC (Zadoff-Chu) sequence, or the like that is preset by the network device and the terminal device.

Optionally, the network device precodes, based on a precoding matrix P, the information that needs to be carried in the reference signal, to obtain a reference signal, and then the network device sends the reference signal to the terminal device. The reference signal has an association relationship with the weight matrix U and a channel between the network device and the terminal device. The channel may be an uplink channel, or may be a downlink channel. The weight matrix U is used by the terminal device to receive a data signal.

In a possible implementation, a quantity of rows or columns of the weight matrix U is N. N is a positive integer less than or equal to a quantity of receive ports of the terminal device.

Optionally, before the network device sends the reference signal to the terminal device, the network device determines the weight matrix U of the terminal device based on uplink channel information obtained by the network device, and determines, by using the weight matrix U, the reference signal to be sent to the terminal device.

For clear and convenient description, the following describes this embodiment of this application by using an example in which the terminal device has only one receive port. It should be understood that the terminal device has at least one receive port, and the technical solution of this application may further be applied to a scenario in which the terminal device has a plurality of receive ports.

For example, there are K (K≥1, and K is an integer) terminal devices that perform data transmission with the network device, and a weight matrix U of a $k^{th}$ (K≥k≥1, and k is an integer) terminal device is $u_k$, and an uplink channel of the $k^{th}$ terminal device obtained by the network device through an SRS is $G_k^T$. After obtaining the uplink channel $G_k^T$ between the network device and the $k^{th}$ terminal device, the network device may determine the weight matrix U of the $k^{th}$ terminal device based on a preset criterion max $u_k^T G_k^T G_k u_k$. In other words, the network device determines, as the weight matrix U of the $k^{th}$ terminal device, $u_k$ that is obtained when a maximum value of $u_k^T G_k^T G_k u_k$ is selected. That is, the weight matrix U may be a first right singular vector of the channel $G_k$. When the terminal device performs signal detection by using the weight matrix U, a received signal to noise indicator of the terminal device may be maximized. $G_k$ is a downlink channel of the network device and the $k^{th}$ terminal device, and the downlink channel $G_k$ may be determined by the network device based on uplink and downlink channel reciprocity and the uplink channel $G_k^T$.

It should be noted that the network device may determine the weight matrix U of the terminal device in the manner provided in the foregoing example, or may determine the weight matrix U of the terminal device in another manner. For example, a column of a discrete fourier transform (DFT) matrix may be determined as the weight matrix U of the terminal device.

Optionally, after determining the weight matrix U of the terminal device, the network device may determine, based on the weight matrix U and the association relationship between the reference signal and the weight matrix U and the channel between the network device and the terminal device, the reference signal to be sent to the terminal device.

Specifically, the network device determines the precoding matrix P based on the weight matrix U of the terminal device determined by the network device and the foregoing association relationship, and sends, to the terminal device, the reference signal obtained by precoding, by using the precoding matrix P, information that needs to be carried in the reference signal. In other words, the reference signal received by the terminal device is determined based on the association relationship.

For example, the precoding matrix P is $P = \alpha H^H (H^H)^{-1} U$. In other words, the association relationship between the reference signal and the weight matrix U and the channel between the network device and the terminal device is: Reference signal=$\alpha H^H (HH^H)^{-1}$ U×information that needs to be carried in the reference signal. H represents the channel between the network device and the terminal device, $H^H$ represents a conjugate transpose of H, and $\alpha$ is a real number. In this case, in the process in which the network device determines the precoding matrix P based on the weight matrix U, the channel represented by H may be a downlink channel. H may have dimensions of $N_1 \times M$. $N_1$ is the quantity of receive ports of the terminal device, and M is a quantity of transmit ports of the network device.

It should be noted that, when the weight matrix U of the terminal device is the detection matrix used by the terminal device to detect the (downlink) data signal, and the weight matrix U of the terminal device is the precoding matrix used by the terminal device to precode the (uplink) data signal, the association relationships between the weight matrices U and the reference signal and the channel between the network device and the terminal device may be different. The real number $\alpha$ is a power factor (which may also be referred to as a compensation factor, a path loss compensation factor, or the like) that has an association relationship with transmit power of the network device, and may be used to compensate for downlink channel transmit power, and limit the transmit power of the network device, so that the transmit power of the network device meets a preset limiting condition. For descriptions of the real number $\alpha$, refer to the descriptions herein. Details are not described again in the following content:

For example, when the network device performs data transmission with the K (K≥1, and K is an integer) terminal devices, the association relationship between the reference signal and the weight matrix U and the channel between the network device and the terminal device is: Reference signal=$\alpha_k G_k^H (G_k G_k^H)^{-1} u_k$×information that needs to be carried in the reference signal. k (K≥k≥1, and k is an integer) represents the $k^{th}$ terminal device that performs data transmission with the network device, $p_k$ represents the precoding matrix P that is used to precode the reference signal and that is sent to the $k^{th}$ terminal device, $u_k$ represents the weight matrix U of the terminal device determined by the network device based on an uplink channel, $G_k$ represents a downlink channel between the network device and the $k^{th}$ terminal device, and may be obtained through an uplink channel $G_k^T$ in a system in which channel reciprocity such as TDD holds, and $G_k^H$ represents a conjugate transpose of $G_k$. $\alpha_k$ is a real number. The real number $\alpha_k$ has an association relationship with the transmit power of the network device, and is a power factor corresponding to the $k^{th}$ terminal device. For descriptions of the real number $\alpha_k$, refer to the foregoing descriptions of the real number $\alpha$. Details are not described herein again.

It should be noted that the network device may determine the reference signal in the manner provided in the foregoing example, or may determine the reference signal in another possible implementation. The association relationship provided in the foregoing example is not unique, and the association relationship may alternatively be another relationship determined based on an actual application scenario. In addition, K provided in the foregoing example may also be a quantity of receive ports of a same terminal device. In this case, k is the $k^{th}$ receive port of the terminal device.

In addition, in this embodiment of this application, the weight matrix U of the terminal device may be at an RB level, a subband level, or a broadband level. Correspondingly, the power factor may be at an RB level, a subband level, or a broadband level. In this case, a few signaling overheads are caused by sending the power factor to the terminal device.

Optionally, the network device sends the data signal and the reference signal to the terminal device in different precoding manners. For example, the network device may precode a data signal by using a precoding matrix W obtained through symbol-level precoding SLP, and send the precoded data signal to the terminal device. Then, the network device may precode, by using the precoding matrix P that is different from the precoding matrix W and that is obtained in the foregoing example, the information that needs to be carried in the reference signal, to obtain the reference signal, and send the reference signal to the terminal device.

Figure 5:
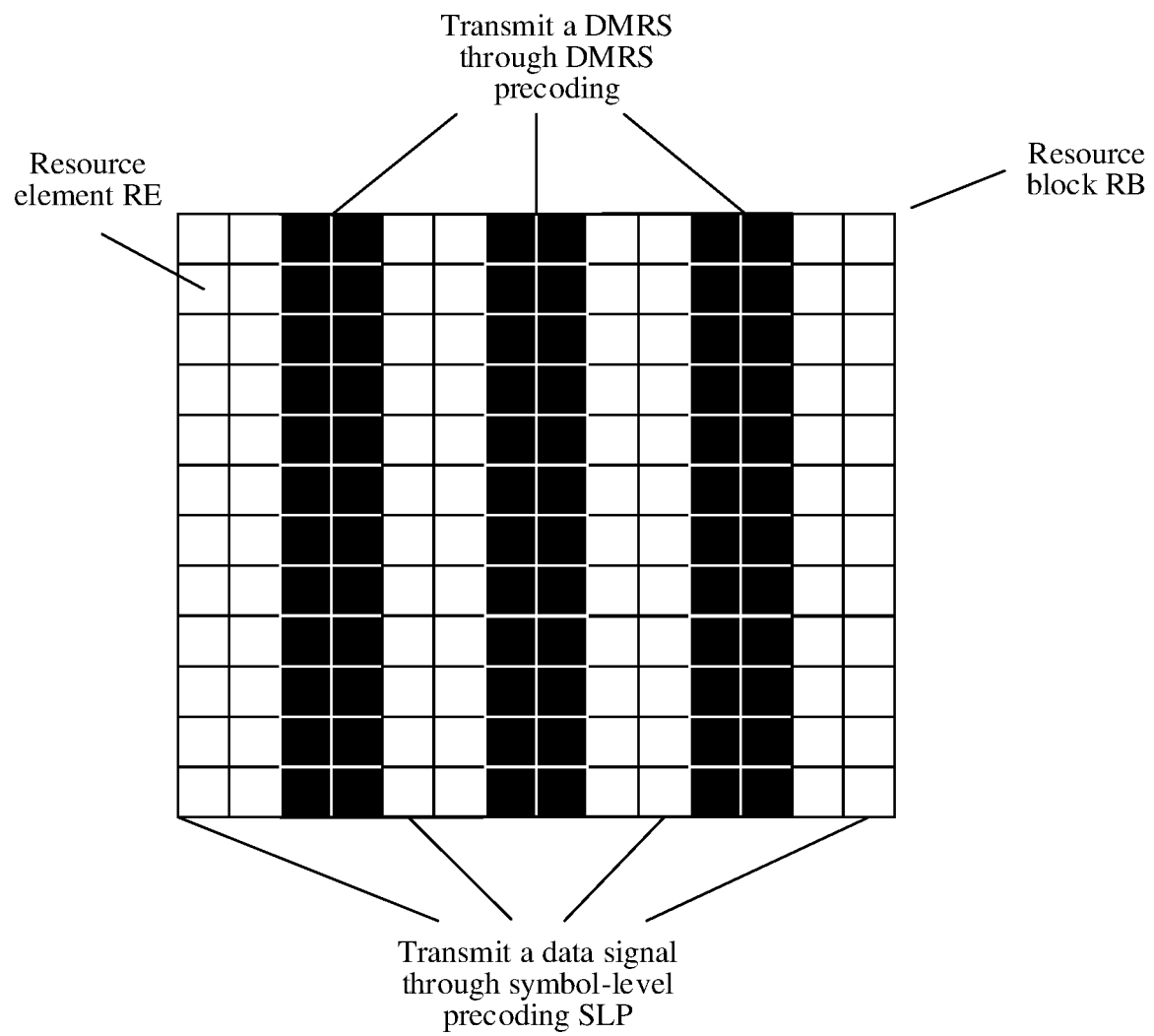
FIG. 5 is a schematic diagram of mapping between data signals and DMRS resources according to this application.

For example, the reference signal is a DMRS. As shown in FIG. 5, on different REs (each small grid is an RE) of a same RB, a data signal and a DMRS are respectively transmitted through symbol-level precoding SLP and DMRS precoding on different resource elements (REs) (time-frequency) of the RB. The data signal is transmitted through the symbol-level precoding SLP on an RE represented by a blank grid, and the DMRS is transmitted through DMRS precoding on an RE represented by a black grid.

In the foregoing process, in a data transmission process, the network device does not need to send the weight matrix U of the terminal device to the terminal device by using additional signaling. Therefore, signaling overheads used during data transmission between the terminal device and the network device are reduced.

S302. The terminal device determines an estimation result of the weight matrix U based on the reference signal.

Optionally, after the terminal device receives the reference signal that is obtained based on the precoding matrix P and that is sent by the network device, the terminal device may estimate, based on the reference signal and the association relationship between the reference signal and the weight matrix U and the channel between the network device and the terminal device, the weight matrix U of the terminal device carried in the reference signal, to obtain the estimation result of the weight matrix U of the terminal device.

When the weight matrix U of the terminal device is the detection matrix used by the terminal device to detect the (downlink) data signal, or the weight matrix U of the terminal device is the precoding matrix used by the terminal device to precode the (uplink) data signal, the association relationships between the weight matrices U and the reference signal and the channel between the network device and the terminal device are different. Therefore, optionally, before determining the estimation result of the weight matrix U, the network device may send third information to the terminal device. The third information indicates the association relationship between the reference signal of the terminal device and the weight matrix U. The terminal device determines, based on the association relationship indicated by the third information, the manner in which the terminal device determines the estimation result of the weight matrix U based on the reference signal.

It should be noted that, in Embodiment 1, the association relationship indicated by the third information is, for example, the association relationship provided in the example of step S301, that is, reference signal=$\alpha H^H (HH^H)^{-1}$ U×information that needs to be carried in the reference signal, or reference signal=$\alpha_k G_k^H (G_k G_k^H)^{-1} u_k$× information that needs to be carried in the reference signal. In this case, the terminal device determines the estimation result of the weight matrix U of the terminal device by using the following method: With reference to an example, the following describes the method in Embodiment 1 in which the terminal device determines the estimation result of the weight matrix U based on the reference signal:

For example, a reference signal received by the terminal device may be represented as $y=HP+n=\alpha U+n$, and y represents a reference signal that is sent by the network device and that is received by the terminal device. n is additive noise. In other words, the reference signal received by the terminal device is a product of the weight matrix U of the terminal device and $\alpha$. In addition, for descriptions of H, P, and $\alpha$, refer to the foregoing examples. In this case, the terminal device may estimate the weight matrix U of the terminal device based on $y/\alpha$, to obtain the estimation result of the weight matrix U of the terminal device.

For example, when the network device may perform data transmission with K (K≥1, and K is an integer) terminal devices, a reference signal received by a $k^{th}$ terminal device that performs data transmission with the network device may also be represented as $y_k=G_k p_k+n_k=\alpha_k u_k+n_k \cdot n_k$ is an additive noise vector. In other words, the reference signal received by the terminal device is a product of a weight matrix $u_k$ of the $k^{th}$ terminal device and $\alpha_k$. In addition, for descriptions of $p_k$, $u_k$, $G_k$, and $\alpha_k$, refer to the foregoing examples. Details are not described below again. In this case, the $k^{th}$ terminal device may estimate the weight matrix U of the $k^{th}$ terminal device based on $y_k/\alpha_k$, to obtain the weight matrix of the $k^{th}$ terminal device.

Optionally, before step S302, the network device may send second information to the terminal device, where the second information indicates $\alpha$. Through this process, the terminal device may determine $\alpha$ based on the second information sent by the network device, and determine the estimation result of the weight matrix U based on the reference signal, $\alpha$, and the association relationship between the foregoing reference signal and the weight matrix U and the channel between the network device and the terminal device, so that the terminal device restores the data signal received from the network device.

The second information and the third information may be different information, or may be same information. The second information and the third information are signaling such as RRC, MAC-CE, and DCI. If the second information and the third information are a same piece of information, signaling overheads used during data transmission between the terminal device and the network device may be further reduced.

It should be noted that a manner in which the terminal device determines the weight matrix U of the terminal device based on the received reference signal is not limited to the manner provided in the foregoing example. For example, the terminal device may obtain the weight matrix U of the terminal device by performing an operation such as a square operation or a square-root operation on a received reference signal y.

In addition, in a data transmission process, the terminal device may directly obtain the estimation result of the weight matrix U based on the reference signal received by the terminal device. In other words, the network device does not need to send the weight matrix U of the terminal device to the terminal device by using additional signaling. Therefore, through the foregoing process, signaling overheads used during data transmission between the terminal device and the network device can be reduced.

S303. The terminal device performs, based on the estimation result of the weight matrix U, signal detection on a data signal received by the terminal device from the network device.

Optionally, before the terminal device performs signal detection on the data signal received by the terminal device from the network device, the terminal device also receives first information sent by the network device, where the first information indicates to the terminal device that the estimation result of the weight matrix U is used by the terminal device to perform signal detection on the data signal received by the terminal device from the network device.

The first information and at least one of the second information and the third information may be different information, or may be same information. In other words, the first information is signaling such as RRC, MAC-CE, and DCI. If the first information, the second information and the third information are a same piece of information, signaling overheads used during data transmission between the terminal device and the network device can be further reduced.

Specifically, the terminal device multiplies the estimation result of the weight matrix U by the data signal received by the terminal device from the network device, to perform signal detection and obtain a signal detection result. Finally, the terminal device may determine, based on the signal detection result, whether the received data signal is accurate.

It should be noted that the multiplication operation performed by the terminal device on the estimation result of the weight matrix U and the data signal received by the terminal device from the network device may be left multiplication or right multiplication, and is not limited to matrix multiplication, and may further include operations such as element multiplication and weighting.

Finally, in Embodiment 1, because the reference signal has an association relationship with the weight matrix U and the channel between the network device and the terminal device, after receiving the reference signal, the terminal device may determine the corresponding weight matrix U based on the reference signal, so that the terminal device performs signal detection on a data signal by using the weight matrix U. In other words, in a data transmission process, the network device does not need to send the weight matrix U of the terminal device to the terminal device by using additional signaling. Therefore, signaling overheads used during data transmission between the terminal device and the network device are reduced.

Embodiment 2

In this embodiment, the weight matrix U of the terminal device is the precoding matrix used by the terminal device to perform data signal precoding. In an uplink data transmission process, the network device determines the precoding matrix of the terminal device based on the uplink channel information obtained during the uplink data transmission, and delivers the precoding matrix to the terminal device. Then, the terminal device precodes an uplink data signal based on the precoding matrix information, to pre-eliminate interference between uplink data streams, so that the network device receives an uplink data signal without interference between data streams. In this embodiment, the weight matrix U of the terminal device is a precoding matrix used by the terminal device to precode a data signal. Therefore, in the following descriptions of this embodiment, the precoding matrix used by the terminal device to precode a data signal is uniformly described as the weight matrix U. Details are not described again.

In this embodiment, the CSI-RS may be used to carry the weight matrix information of the terminal device, so as to reduce signaling overheads required for the network device to deliver the weight matrix U to the terminal device. Therefore, signaling overheads used during data transmission between the network device and the terminal device are reduced. In other words, in this embodiment of this application, after determining the weight matrix U of the terminal device, the network device uses the CSI-RS to carry the weight matrix U. It should be noted that the network device may alternatively use another reference signal other than the CSI-RS to carry the weight matrix U in an actual case.

Figure 4:
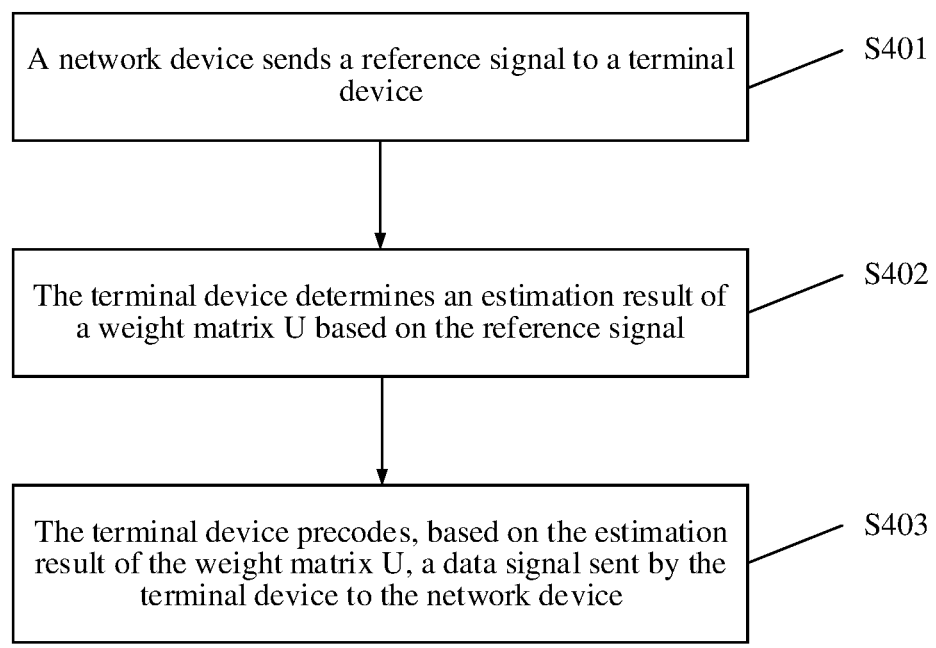
FIG. 4 is a schematic flowchart 2 of a communication method according to this application.

As shown in FIG. 4, the method includes S401 to S403.

S401. A network device sends a reference signal to a terminal device.

Correspondingly, the terminal device receives the reference signal sent by the network device.

For example, the reference signal sent by the network device to the terminal device may be a channel state information reference signal (CSI-RS).

Information carried in the reference signal may be an orthogonal OCC (orthogonal cover code) sequence, a ZC (Zadoff-Chu) sequence, or the like that is preset by the network device and the terminal device.

Optionally, the network device precodes, based on a precoding matrix P, the information that needs to be carried in the reference signal, to obtain a reference signal, and then the network device sends the reference signal to the terminal device. The reference signal has an association relationship with the weight matrix U and a channel between the network device and the terminal device. The channel may be an uplink channel, or may be a downlink channel. The weight matrix U is used by the terminal device to send a data signal.

In a possible implementation, a quantity of rows or columns of the weight matrix U is N. N is a positive integer less than or equal to a quantity of receive ports of the terminal device.

Optionally, before the network device sends, to the terminal device, the reference signal obtained based on the precoding matrix P, the network device determines the weight matrix U of the terminal device based on uplink channel information obtained by the network device, and determines, by using the weight matrix U, the reference signal to be sent to the terminal device.

For clear and convenient description, the following describes this embodiment of this application by using an example in which the terminal device has only one transmit port. It should be understood that the terminal device has at least one transmit port, and the technical solution of this application may further be applied to a scenario in which the terminal device has a plurality of transmit ports.

For an example of a manner in which the network device determines the weight matrix of the terminal device, refer to the example in Embodiment 1. Details are not described herein again. Similarly, the network device may determine the weight matrix U of the terminal device in the manner provided in the foregoing example, or may determine the weight matrix U of the terminal device in another manner. For example, a column of a discrete fourier transform (DFT) matrix is determined as the weight matrix U of the terminal device.

Optionally, after determining the weight matrix U of the terminal device, the network device may determine, based on the weight matrix U and the association relationship between the reference signal and the weight matrix U and the channel between the network device and the terminal device, the reference signal to be sent to the terminal device.

Specifically, the network device determines the precoding matrix P based on the weight matrix U of the terminal device determined by the network device and the foregoing association relationship, and sends, to the terminal device, the reference signal obtained by precoding, by using the precoding matrix P, information that needs to be carried in the reference signal. In other words, the reference signal received by the terminal device is determined based on the association relationship.

It should be noted that, when the weight matrix U of the terminal device is the detection matrix used by the terminal device to detect the (downlink) data signal, and the weight matrix U of the terminal device is the precoding matrix used by the terminal device to precode the (uplink) data signal, the association relationships between the weight matrices U and the precoding matrix P and the channel between the network device and the terminal device are different.

For example, the precoding matrix P is $P=\alpha H^H(HH^H)^{-1}(1 \otimes U)$ or $P=\alpha H^H(HH^H)^{-1}(U \otimes 1)$. In other words, the association relationship between the reference signal and the weight matrix U and the channel between the network device and the terminal device is as follows: Reference signal=$\alpha H^H(HH^H)^{-1}(1 \otimes U) \times$information that needs to be carried in the reference signal, or reference signal=$\alpha H^H(HH^H)^{-1}(U \otimes 1) \times$information that needs to be carried in the reference signal. H indicates the channel between the network device and the terminal device, $H^H$ indicates a conjugate transpose of H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device. In this case, in the process in which the network device determines the precoding matrix P based on the weight matrix U, the channel represented by H may be a downlink channel. H may have dimensions of $N_1 \times M$. M is a quantity of transmit ports of the network device.

It should be noted that the network device may determine, in the manner provided in the foregoing example, the precoding matrix P used for precoding the reference signal, or may determine the precoding matrix P in another possible implementation. The association relationship provided in the foregoing example is not unique, and the association relationship may alternatively be another relationship determined based on an actual application scenario. In addition, K provided in the foregoing example may also be a quantity of receive ports of a same terminal device. In this case, k is the $k^{th}$ receive port of the terminal device. In addition, K provided in the foregoing example may also be a quantity of receive ports of a same terminal device. In this case, k is the $k^{th}$ receive port of the terminal device.

In addition, in this embodiment of this application, the weight matrix U of the terminal device may be at an RB level, a subband level, or a broadband level. Correspondingly, the power factor $\alpha$ may be at an RB level, a subband level, or a broadband level. In this case, a few signaling overheads are caused by sending the power factor to the terminal device.

In the foregoing process, in a data transmission process, the network device does not need to send the weight matrix U of the terminal device to the terminal device by using additional signaling. Therefore, signaling overheads used during data transmission between the terminal device and the network device are reduced.

S402. The terminal device determines an estimation result of the weight matrix U based on the reference signal.

Optionally, after the terminal device receives the reference signal that is obtained based on the precoding matrix P and that is sent by the network device, the terminal device may estimate, based on the reference signal, the association relationship between the reference signal and the weight matrix U and the channel between the network device and the terminal device, the weight matrix U of the terminal device carried in the reference signal, to obtain the estimation result of the weight matrix U of the terminal device.

When the weight matrix U of the terminal device is the detection matrix used by the terminal device to detect the (downlink) data signal, or the weight matrix U of the terminal device is the precoding matrix used by the terminal device to precode the (uplink) data signal, the association relationships between the weight matrices U and the precoding matrix P and the channel between the network device and the terminal device are different. Therefore, optionally, before determining the estimation result of the weight matrix U, the network device may send third information to the terminal device. The third information indicates the association relationship between the reference signal of the terminal device and the weight matrix U. The terminal device determines, based on the association relationship indicated by the third information, the manner in which the terminal device determines the estimation result of the weight matrix U based on the reference signal.

It should be noted that, in Embodiment 2, the association relationship indicated by the third information is, for example, the association relationship provided in the example of step S401, that is, the association relationship between the reference signal and the weight matrix U and the channel between the network device and the terminal device is: Reference signal=$\alpha H^H(HH^H)^{-1}(1 \otimes U) \times$information that needs to be carried in the reference signal, or reference signal=$\alpha H^H(HH^H)^{-1}(U \ominus 1) \times$information that needs to be carried in the reference signal. In this case, the terminal device determines the estimation result of the weight matrix U of the terminal device by using the following method: With reference to an example, the following describes the method in this embodiment in which the terminal device determines the estimation result of the weight matrix U based on the reference signal:

For example, a reference signal received by the terminal device may be represented as y=HP+n=$\alpha 1 \ominus U$+n or y=HP+n=$\alpha U \ominus 1$+n, and y represents a reference signal that is sent by the network device and that is received by the terminal device. n is additive noise. In other words, the reference signal received by the terminal device is a product of $1 \otimes U$ and $\alpha$, or the reference signal received by the terminal device is a product of $U \otimes 1$ and $\alpha$, and U is a weight matrix of the terminal device. In addition, for descriptions of H, P, and $\alpha$, refer to the foregoing examples. In this case, the terminal device may estimate the weight matrix U of the terminal device based on $(N_2/\alpha N_1)\Sigma_{n=1}^{N_1/N_2} y(N_2(n-1)+1:N_2(n-1)+N_2)$ or $(N_2/\alpha N_1)\Sigma_{n=1}^{N_1/N_2} y(N_1/N_2(0:(N_2-1))+n)$, to obtain the estimation result of the weight matrix U of the terminal device.

Optionally, before step S402, the network device may send second information to the terminal device, where the second information indicates $\alpha$. For descriptions of the second information and the third information, refer to Embodiment 1. Details are not described herein again.

It should be noted that a manner in which the terminal device determines the weight matrix U of the terminal device based on the received reference signal is not limited to the manner provided in the foregoing example. In addition, in a data transmission process, the terminal device may directly obtain the estimation result of the weight matrix U based on the reference signal received by the terminal device. In other words, the network device does not need to send the weight matrix U of the terminal device to the terminal device by using additional signaling. Therefore, through the foregoing process, signaling overheads used during data transmission between the terminal device and the network device can be reduced.

S403. The terminal device precodes, based on the estimation result of the weight matrix U, a data signal sent by the terminal device to the network device.

Optionally, before the terminal device precodes the data signal sent to the network device, the terminal device further receives first information sent by the network device. The first information indicates to the terminal device that the estimation result of the weight matrix U is used to precode the data signal sent by the terminal device to the network device. For descriptions of the first information, refer to Embodiment 1. Details are not described herein again.

Specifically, the terminal device multiplies the estimation result of the weight matrix U by the data signal sent by the terminal device to the network device, to perform precoding, and obtain a precoding result, that is, a precoded data signal. Finally, the terminal device may send the precoded data signal to the network device.

It should be noted that the multiplication operation performed by the terminal device on the estimation result of the weight matrix U and the data signal sent by the terminal device to the network device may be left multiplication or right multiplication, and is not limited to matrix multiplication, and may further include operations such as element multiplication and weighting.

Finally, in Embodiment 2, because the reference signal has an association relationship with the weight matrix U and the channel between the network device and the terminal device, after receiving the reference signal obtained based on the precoding matrix P, the terminal device may determine the corresponding weight matrix U based on the reference signal, so that the terminal device precodes a data signal by using the weight matrix U. In other words, in a data transmission process, the network device does not need to send the weight matrix U of the terminal device to the terminal device by using additional signaling. Therefore, signaling overheads used during data transmission between the terminal device and the network device are reduced.

Embodiment 3

The following describes the symbol-level precoding SLP in Embodiment 1:

The symbol-level precoding SLP depends on a constellation diagram obtained through data signal modulation. Therefore, the constellation diagram is first briefly described. Generally, the data signal may be expressed in a form of a complex number, and therefore the digital signal may be mapped onto a complex plane. A constellation diagram may be obtained by mapping digital signals to a complex plane. The constellation diagram may intuitively represent a relationship between the data signals, and may be used to determine a bit error rate of a modulation scheme, and the like.

Figure 6:
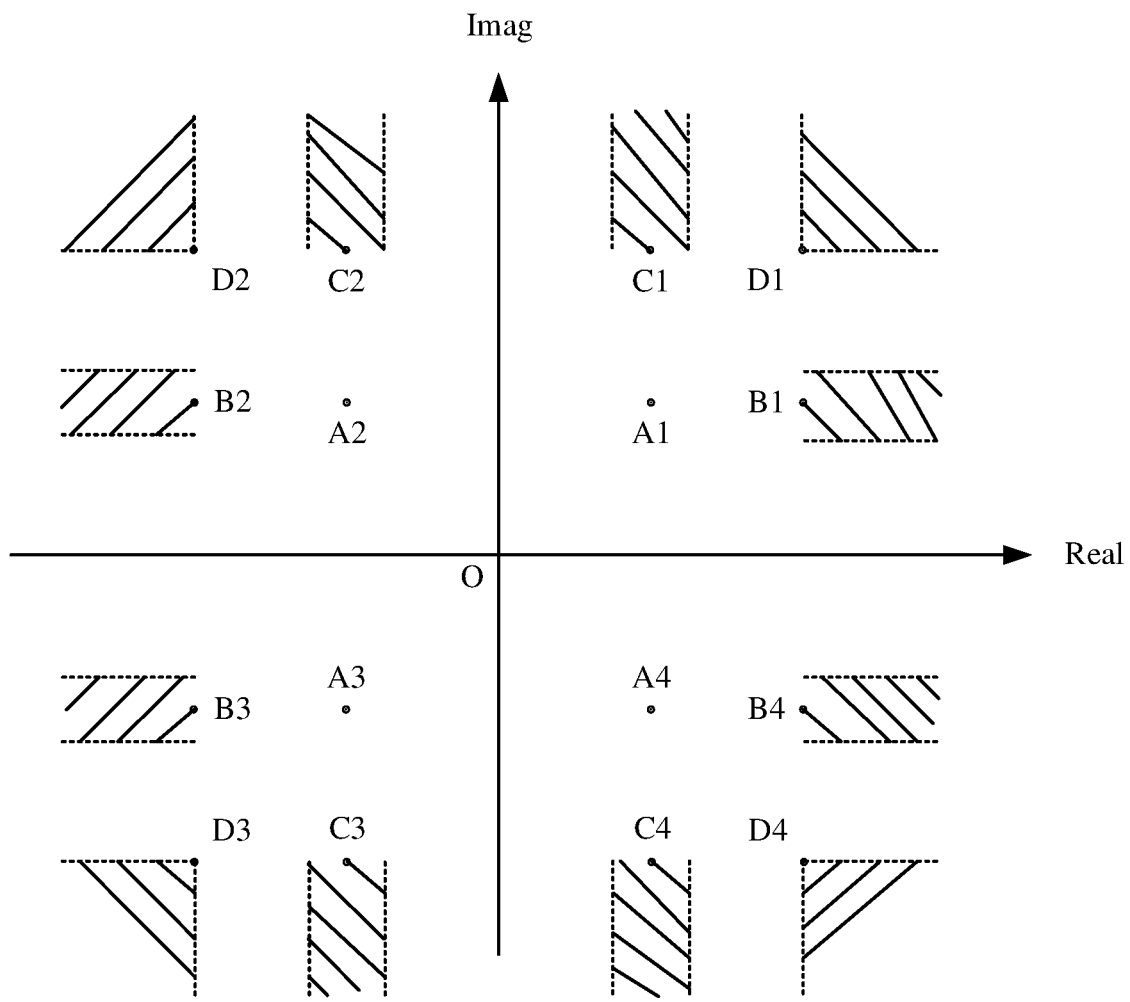
FIG. 6 is a 16QAM constellation diagram 1 according to this application.

For example, a 16QAM constellation diagram of quadrature amplitude modulation (QAM) shown in FIG. 6 is used as an example. A horizontal coordinate in the constellation diagram represents a size of a real part of a constellation point, and a vertical coordinate in the constellation diagram represents a size of an imaginary part of the constellation point. The constellation diagram includes 16 constellation points: A1 to A4, B1 to B4, C1 to C4, and D1 to D4. Decision fields of both real parts and imaginary parts of the constellation points A1 to A4 have boundaries, decision fields of real parts of the constellation points B1 to B4 have no boundaries, decision fields of imaginary parts of the constellation points B1 to B4 have boundaries, decision fields of real parts of the constellation points C1 to C4 have boundaries, decision fields of imaginary parts of the constellation points C1 to C4 have no boundaries, and decision fields of both real parts and imaginary parts of the constellation points D1 to D4 have no boundaries.

In the symbol-level precoding SLP, all real parts and imaginary parts that are of constellation points and whose decision fields have boundaries in a data signal are amplified by a same multiple t, and amplification multiples (that is, extension coefficients) of all real parts and imaginary parts that are of constellation points and whose decision fields have no boundaries are greater than t, so that a constellation diagram including all data signals received by the terminal device can be extended as a whole. For example, a constellation diagram obtained by mapping data signals received by the terminal device is shown in (a) in FIG. 7. In this case, received signal noise of all data signals received by the terminal device is relatively high. However, to ensure that the terminal device can correctly demodulate the data signals received by the terminal device, the network device needs to send an extension coefficient of each data signal to the terminal device by using additional signaling. Because the data signal is at an RE (resource element) level, signaling overheads used during data transmission between the terminal device and the network device are very high. To resolve the foregoing problem, in this embodiment of this application, a symbol-level precoding scheme in which extension coefficients of real parts and imaginary parts that are of constellation points and whose decision fields have boundaries are set to 1 is proposed. In this case, the network device does not need to deliver the extension coefficients of the constellation points, and the terminal device can also correctly demodulate the constellation points. Therefore, signaling overheads used during data transmission between the terminal device and the network device are reduced.

With reference to an example, the following describes a process in which the network device in a MIMO system determines, based on a downlink channel, a precoding matrix W used for symbol-level precoding SLP and an extension coefficient t of a constellation point corresponding to a data signal:

For example, the network device is configured with N transmit ports, and may send data streams to K terminal devices (for example, each terminal device corresponds to a data stream). Each terminal device is configured with U receive ports. It is assumed that a precoding matrix W of a data signal of the network device is $W \in C^{N \times K}$, a constellation point vector (corresponding to the data signal) sent by the network device is $s \in C^{K \times 1}$, a downlink channel from the network device to a $k^{th}$ terminal device is $G_k \in C^{U \times N}$, a detection matrix of the $k^{th}$ terminal device is $u_k^T \in C^{1 \times U}$, and a data signal received by the $k^{th}$ terminal device is $r_k = u_k^T G_k W s + n$. n is an additive white Gaussian noise vector in normal distribution, that is, $n \sim CN(0, \sigma^2)$, and $\sigma^2$ is noise power distribution.

The network device may determine, according to the following symbol-level precoding SLP design rule, that is:

$P_1$ $\max_{W,t} t$ s.t. C1. $h_k^T W s = \Omega_k^T \tilde{s}_k$, $\forall k \in K$ C2. $t \leq \alpha_m^O$, $\forall \alpha_m^O \in O$ C3. $1 = \alpha_n^I \in I$, C4. $t \geq 1$ C5. $\|Ws\|_2^2 \leq p_0$ a precoding matrix W for symbol-level precoding SLP and t. $h_k^T = u_k^T G_k$ represents an equivalent downlink channel that includes a detection matrix of the terminal device, and $s_k$ in $\tilde{s}_k = [Re(s_k), j\ Im(s_k)]^T$ represents a $k^{th}$ element of the constellation point vector s sent by the network device, that is, a constellation point obtained by mapping data signals sent by the network device to the $k^{th}$ terminal device. In $\Omega_k = [\alpha_k^{Re}, \alpha_k^{Im}]^T$, $\alpha_k^{Re} \in R^+$ and $\alpha_k^{Im} \in R^+$ respectively represent an extension coefficient of a real part of $S_k$ and an extension coefficient of an imaginary part of $S_k$. K indicates a set {1, 2, ..., K}. C1 indicates that a data signal that is received by the $k^{th}$ terminal device and that is superimposed with the interference data is the same as a data signal $S_k$ obtained after a real part and an imaginary part are extended. O represents a set of extension coefficients of real parts or imaginary parts that are of all constellation points and whose decision fields have boundaries in s, $\alpha_m^O$ represents an $m^{th}$ extension coefficient in O, I represents a set of extension coefficients of real parts and imaginary parts that are of all constellation points and whose decision fields have boundaries in S, and $\alpha_n^I$ represents an $n^{th}$ extension coefficient in I. For example, S includes three elements, which are respectively three constellation points A1, B1, and D1 in the first quadrant shown in FIG. 6. In the three constellation points, a set of real parts and imaginary parts whose decision fields have no boundaries is $O = \{\alpha_2^{Re}, \alpha_3 Re, \alpha_3^{Im}\}$, and a set of real parts and imaginary parts whose decision fields have boundaries is $I = \{\alpha_1^{Re}, \alpha_1^{Im}, \alpha_2^{Im}\}$. $p_0$ indicates transmit power of the network device.

C1 indicates that a superimposed signal of a data signal received by the $k^{th}$ terminal device and an interference signal is exactly equal to a data signal obtained after a real part and an imaginary part are extended. C2 indicates that extension coefficients (elements in O) of real parts or imaginary parts that are of all constellation points and whose decision fields have no boundaries are greater than or equal to t. C3 indicates that extension coefficients (elements in I) of real parts or imaginary parts that are of all constellation points and whose decision fields have boundaries are equal to 1. C4 indicates that tin C3 is greater than or equal to 1. C5 indicates that the transmit power of the network device is limited to the power limit condition.

It should be noted that $P_1$ may be solved by using a classical convex optimization algorithm such as a Lagrange multiplier method, to obtain W and t.

For example, the formula is solved based on $$W = \frac{1}{K} H^H (HH^H)^{-1} U \text{diag}(\Omega) s_E \hat{s}^T.$$

$H = [h_1, h_2, \ldots, h_K]$ represents an equivalent downlink channel of K terminal devices that perform data transmission with the network device, $U = I_K \otimes [1,1]$, $I_K$ represents a unit matrix of K×K dimensions, $\Omega = [\Omega_1^T, \Omega_2^T, \ldots, \Omega_K^T]^T = [\alpha_1^{Re}, \alpha_1^{Im}, \alpha_2^{Re}, \alpha_2^{Im}, \ldots, \alpha_K^{Re}, \alpha_K^{Im}]^T$, $s_E = [\tilde{s}_1^T, \tilde{s}_2^T, \ldots, \tilde{s}_K^T]^T$, and $\hat{s} = [1/s_1, 1/s_2, \ldots, 1/s_K]^T$. A vector $\alpha_O$ is obtained by extracting elements that belong to O and that are in $\Omega$, where $$\alpha_O = \sqrt{\frac{p}{u^T V_1^{-1} u}} V_1^{-1} u - V_1^{-1} V_2 1.$$

A vector $\alpha_I$ is obtained by extracting elements that belong to I and that are in $\Omega$, where $\alpha_I=[1, 1, \ldots, 1]^T$. In this case, it may be determined that $\tilde{\Omega}=[\alpha_O{}^T, \alpha_I{}^T]^T=F\Omega$, where F is a sorting matrix. $\tilde{p}=p_0+1^T V_2{}^T V_1{}^{-1} V_2 1 - 1^T V_3 1$, $V=F\,Re(\mathrm{diag}(s_E{}^H)U^H(HH^H)^{-1}U\mathrm{diag}(s_E))F^T$, $$\text{and } V = \begin{bmatrix} V_1 & V_2 \\ V_2^T & V_3 \end{bmatrix}.$$

Further, u may be obtained by solving the optimization problem, that is, $$P_5 \min_u \sqrt{\tilde{p} u^T V_1^{-1} u} - u^T V_1^{-1} V_2 1 - 1^T u$$

$$\text{s.t. } \mu_m \geq 0,$$

and the solving method includes a search method, a lagrange multiplier method, and the like.

For example, after the extension coefficients of the real parts and the imaginary parts of the constellation points whose decision fields have boundaries are set to 1, and the precoding matrix W used by the network device for data signal precoding is determined by using the foregoing process, the network device sends, to the terminal device, a data signal obtained after precoding is performed by using the precoding matrix W, to obtain a constellation diagram shown in (b) in FIG. 7.

For example, 16QAM shown in FIG. 6 is used as an example. With reference to FIG. 6, (a) in FIG. 7, and (b) in FIG. 7, it can be learned that when the network device corresponding to (b) in FIG. 7 uses the foregoing symbol-level precoding scheme, in data signals received by the terminal device, constellation points whose decision fields have boundaries are not extended, and locations of these constellation points remain unchanged. In other words, when the terminal device correctly demodulates the data signal, the signaling overheads used during data transmission between the terminal device and the network device are further reduced.

In conclusion, in the symbol-level precoding scheme in which the extension coefficients of the real parts and the imaginary parts of the constellation points whose decision fields have boundaries are set to 1, when the network device does not need to deliver the extension coefficients of the constellation points, the terminal device may also correctly perform demodulation. Therefore, signaling overheads used during data transmission between the terminal device and the network device are reduced.

The foregoing mainly describes the solutions in embodiments of this application from a perspective of interaction between network elements. It may be understood that, to implement the foregoing functions, the network elements such as the access network device and the terminal include corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the access network device and the terminal may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in this embodiment of this application, division into the units is an example, and is merely logical function division. In actual implementation, another division manner may be used.

FIG. 8 is a possible schematic structural diagram of a communication apparatus when various function modules corresponding to various functions are obtained through division. The communication apparatus includes a receiving unit 801 and an estimation unit 802. Certainly, the communication apparatus may further include another module, or the communication apparatus may include fewer modules. Optionally, the communication apparatus further includes a signal detection unit 803 and a precoding unit 804. Optionally, the communication apparatus further includes a sending unit 805, a storage unit 806, and the like. The schematic structural diagram shown in FIG. 8 may be specifically used to show a structure of a terminal device.

When the schematic structural diagram shown in FIG. 8 is used to show the structure of the terminal device in the foregoing embodiments, the estimation unit 802, the signal detection unit 803, and the precoding unit 804 are configured to control and manage an action of the terminal device. For example, the estimation unit 802 is configured to support the terminal device in performing S302 in FIG. 3, S402 in FIG. 4, and/or actions performed by the terminal device in another process described in embodiments of this application. The signal detection unit 803 is configured to support the terminal device in performing S303 in FIG. 3 and/or an action performed by the access network device in another process described in embodiments of this application. The precoding unit 804 is configured to support the terminal device in performing S403 in FIG. 4 and/or an action performed by the access network device in another process described in embodiments of this application. The estimation unit 802, the signal detection unit 803, and the precoding unit 804 may communicate with another network entity by using the receiving unit 801 and the sending unit 805, for example, communicate with a network device in a communication system. The storage unit 806 is configured to store program code and data of the terminal device.

When the schematic structural diagram shown in FIG. 8 is used to show the structure of the terminal device in the foregoing embodiments, the communication apparatus may be a device, or may be a chip in the device.

FIG. 9 is a possible schematic structural diagram of a communication apparatus when various function modules are obtained through division based on various functions. The communication apparatus includes a sending unit 901. Certainly, the communication apparatus may further include another module, or the communication apparatus may include fewer modules. Optionally, the communication apparatus further includes a receiving unit 902, a processing unit 903, a storage unit 904, and the like. The schematic structural diagram shown in FIG. 9 may be specifically used to show a structure of the network device.

When the schematic structural diagram shown in FIG. 9 is used to illustrate the structure of the network device in the foregoing embodiments, the processing unit 903 is configured to control and manage an action of the network device. The processing unit 903 is configured to support the network device in performing an action performed by the network device described in the embodiments of this application. The processing unit 903 may communicate with another network entity through the receiving unit 902 and the sending unit 901, for example, communicate with a terminal device in a communication system. The storage unit 904 is configured to store program code and data of the network device.

When the schematic structural diagram shown in FIG. 9 is used to show a structure of the network device in the foregoing embodiments, the communication apparatus may be a device, or may be a chip in a device.

When integrated units in FIG. 8 and FIG. 9 each are implemented in a form of a software functional module and sold or used as an independent product, the integrated units may be stored in a computer-readable storage medium. Based on such an understanding, the technical solutions of embodiments of this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The storage medium that stores the computer software product includes any medium that can store program code, such as a USB flash drive, a removable hard disk, a read-only memory (ROM), a random access memory (RAM), a magnetic disk, or an optical disc.

The units in FIG. 8 or FIG. 9 may also be referred to as modules. For example, the receiving unit may be referred to as a receiving module.

FIG. 10 is a schematic diagram of a hardware structure of a communication apparatus according to an embodiment of this application. The communication apparatus includes one or more processors 1001 and a communication interface 1003.

Optionally, the communication apparatus further includes a memory 1004, and the memory 1004 is coupled to the processor 1001. The memory 1004 may include a ROM and a RAM, and provide operation instructions and data to the processor 1001. A part of the memory 1004 may further include a nonvolatile random access memory (NVRAM).

In this embodiment of this application, the communication apparatus performs corresponding operations by invoking the operation instructions (where the operation instructions may be stored in an operating system) stored in the memory 1004.

The processor 1001 may also be referred to as a central processing unit (CPU).

The processor 1001, the communication interface 1003, and the memory 1004 are coupled together through a communication bus 1002. The communication bus 1002 may further include a power bus, a control bus, a status signal bus, and the like in addition to a data bus. However, for clarity of description, various buses are marked as the communication bus 1002 in FIG. 10.

The methods disclosed in the foregoing embodiments of this application may be applied to the processor 1001 or implemented by the processor 1001. The processor 1001 may be an integrated circuit chip and has a signal processing capability. In an implementation process, each step in the foregoing method may be completed by using an integrated logic circuit of hardware in the processor 1001 or instructions in a form of software. The foregoing processor 1001 may be a general purpose processor, a digital signal processor (DSP), an application-specific integrated circuit (ASIC), a field-programmable gate array (FPGA) or another programmable logic device, a discrete gate or transistor logic device, or a discrete hardware component. It may implement or perform the methods, the steps and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be located in a mature storage medium in the art, such as a RAM, a flash memory, a ROM, a programmable read-only memory, an electrically erasable programmable memory, or a register. The storage medium is located in the memory 1004, and the processor 1001 reads information in the memory 1004 and completes the steps in the foregoing methods in combination with hardware of the processor.

For example, the schematic structural diagram shown in FIG. 10 may be used to show a structure of the communication apparatus in the foregoing embodiments, and may be specifically used to show structures of the terminal device and the network device.

When the schematic structural diagram shown in FIG. 10 is used to show the structure of the terminal device in the foregoing embodiments, the processor 1001 is configured to control and manage an action of the network device. For example, the processor 1001 is configured to support the terminal device in performing S302 and S303 in FIGS. 3, S402 and S403 in FIG. 4, and/or actions performed by the terminal device in another process described in embodiments of this application. The processor 1001 may communicate with another network entity through the communication interface 1003, for example, communicate with the network device shown in FIG. 3. The memory 1004 is configured to store program code and data of the terminal device.

When the schematic structural diagram shown in FIG. 10 is used to show the structure of the network device in the foregoing embodiments, the processor 1001 is configured to control and manage an action of the terminal, and the processor 1001 is configured to support the network device in performing an action performed by the network device in all processes described in embodiments of this application. The processor 1001 may communicate with another network entity through the communication interface 1003, for example, communicate with the terminal device shown in FIG. 3 or FIG. 4. The memory 1004 is configured to store program code and data of the network device.

The foregoing communication unit or communication interface may be an interface circuit or a communication interface in the apparatus for receiving a signal from another apparatus. For example, when the apparatus is implemented as a chip, the communication unit or communication interface is an interface circuit or a communication interface in the chip for receiving a signal from or sending a signal to another chip or apparatus.

All or some of the foregoing embodiments may be implemented by using software, hardware, firmware, or any combination thereof. When a software program is used to implement embodiments, embodiments may be implemented completely or partially in a form of a computer program product. For example, instructions that are stored in the memory and that are executed by the processor may be implemented in a form of a computer program product. The computer program product may be written into the memory in advance, or may be downloaded and installed in the memory in a form of software. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid-state drive, SSD), or the like.

Optionally, an embodiment of this application further provides a computer-readable storage medium. The computer-readable storage medium stores computer instructions. When the computer-readable storage medium is run on a computer, the computer is enabled to perform the communication methods provided in embodiments of this application.

An embodiment of this application further provides a computer program product that includes computer instructions. When the computer program product runs on a computer, the computer is enabled to perform the communication methods provided in embodiments of this application.

An embodiment of this application further provides a chip. The chip includes a processor and an interface. The processor is coupled to a memory through the interface. When the processor executes a computer program or instructions in the memory, the communication methods provided in embodiments of this application are performed.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Although this application is described with reference to embodiments, in a process of implementing this application that claims protection, persons skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the scope of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies:

What is claimed is:

1. A communication method, wherein the communication method comprises:
   receiving, by a terminal device, a reference signal sent by a network device, wherein the reference signal has an association relationship with a weight matrix and a channel between the network device and the terminal device, wherein the weight matrix is determined at least based on a predetermined factor associated with transmit power of the network device, and wherein a quantity of rows or columns of the weight matrix is N, and N is a positive integer less than or equal to a quantity of receive ports of the terminal device; and
   determining, by the terminal device, an estimation result of the weight matrix based on the reference signal, wherein:
      the estimation result of the weight matrix is used by the terminal device to perform signal detection on a data signal received by the terminal device from the network device; or
      the estimation result of the weight matrix is used by the terminal device to precode a data signal sent by the terminal device to the network device.

2. The communication method according to claim 1, wherein that the estimation result of the weight matrix is used by the terminal device to perform signal detection on a data signal received by the terminal device from the network device comprises:
   multiplying, by the terminal device, the estimation result of the weight matrix by the data signal received from the network device.

3. The communication method according to claim 1, wherein that the estimation result of the weight matrix is used by the terminal device to precode a data signal sent by the terminal device to the network device comprises:
   multiplying, by the terminal device, the estimation result of the weight matrix by the data signal sent by the terminal device to the network device.

4. The communication method according to claim 1, wherein when the estimation result of the weight matrix is used by the terminal device to perform signal detection on a data signal received by the terminal device from the network device, the communication method further comprises:
   receiving, by the terminal device, first information sent by the network device, wherein the first information indicates to the terminal device that the estimation result of the weight matrix is used by the terminal device to perform signal detection on a data signal received by the terminal device from the network device.

5. The communication method according to claim 1, wherein when the estimation result of the weight matrix is used by the terminal device to precode a data signal sent by the terminal device to the network device, the communication method further comprises:
receiving, by the terminal device, first information sent by the network device, wherein the first information indicates to the terminal device that the estimation result of the weight matrix is used by the terminal device to precode a data signal sent by the terminal device to the network device.

6. The communication method according to claim 1, wherein that the reference signal has an association relationship with a weight matrix and a channel between the network device and the terminal device comprises:
the reference signal is determined by a matrix $P=\alpha H^H (HH^H)^{-1} U$, wherein H represents the channel between the network device and the terminal device, $H^H$ represents a conjugate transpose of the H, and $\alpha$ is a real number.

7. The communication method according to claim 1, wherein that the reference signal has an association relationship with a weight matrix and a channel between the network device and the terminal device comprises:
the reference signal is determined by a matrix $P=\alpha H^H (HH^H)^{-1} (1 \otimes U)$ or $P=\alpha H^H (HH^H)^{-1} (U \otimes 1)$, wherein H represents the channel between the network device and the terminal device, $H^H$ represents a conjugate transpose of the H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

8. The communication method according to claim 6, wherein $\alpha$ has an association relationship with transmit power of the network device.

9. The communication method according to claim 6, wherein the communication method further comprises:
receiving, by the terminal device, second information sent by the network device, wherein the second information indicates $\alpha$.

10. The communication method according to claim 1, wherein the communication method further comprises:
receiving, by the terminal device, third information sent by the network device, wherein the third information indicates the association relationship between the reference signal and the weight matrix to the terminal device.

11. A communication method, wherein the communication method comprises:
sending, by a network device, a reference signal to a terminal device, wherein the reference signal has an association relationship with a weight matrix and a channel between the network device and the terminal device, wherein the weight matrix is determined at least based on a predetermined factor associated with transmit power of the network device, and wherein:
a quantity of rows or columns of the weight matrix is N, and N is a positive integer less than or equal to a quantity of receive ports of the terminal device; and
the reference signal is used by the terminal device to determine an estimation result of the weight matrix, wherein:
the estimation result of the weight matrix is used by the terminal device to perform signal detection on a data signal received by the terminal device from the network device; or
the estimation result of the weight matrix is used by the terminal device to precode a data signal sent by the terminal device to the network device.

12. The communication method according to claim 11, wherein when the estimation result of the weight matrix is used by the terminal device to perform signal detection on a data signal received by the terminal device from the network device, the communication method further comprises:
sending, by the network device, first information to the terminal device, wherein the first information indicates to the terminal device that the estimation result of the weight matrix is used by the terminal device to perform signal detection on a data signal received by the terminal device from the network device.

13. The communication method according to claim 11, wherein when the estimation result of the weight matrix is used by the terminal device to precode a data signal sent by the terminal device to the network device, the communication method further comprises:
sending, by the network device, first information to the terminal device, wherein the first information indicates to the terminal device that the estimation result of the weight matrix is used by the terminal device to precode a data signal sent by the terminal device to the network device.

14. The communication method according to claim 11, wherein that the reference signal has an association relationship with a weight matrix and a channel between the network device and the terminal device comprises:
the reference signal is determined by a matrix $P=\alpha H^H (HH^H)^{-1} U$, wherein H represents the channel between the network device and the terminal device, $H^H$ represents a conjugate transpose of the H, and $\alpha$ is a real number.

15. The communication method according to claim 11, wherein that the reference signal has an association relationship with a weight matrix and a channel between the network device and the terminal device comprises:
the reference signal is determined by a matrix $P=\alpha H^H (HH^H)^{-1} (1 \otimes U)$ or $P=\alpha H^H (HH^H)^{-1} (U \otimes 1)$, wherein H represents the channel between the network device and the terminal device, $H^H$ represents a conjugate transpose of the H, $\alpha$ is a real number, 1 is an $N_1/N_2 \times 1$-dimensional all-1 vector, $N_1$ is the quantity of receive ports of the terminal device, and $N_2$ is a quantity of transmit ports of the terminal device.

16. The communication method according to claim 14, wherein $\alpha$ has an association relationship with transmit power of the network device.

17. The communication method according to claim 15, wherein the communication method further comprises:
sending, by the network device, second information to the terminal device, wherein the second information indicates $\alpha$.

18. The communication method according to claim 11, wherein the communication method further comprises:
sending, by the network device, third information to the terminal device, wherein the third information indicates the association relationship between the reference signal and the weight matrix to the terminal device.

19. A communication apparatus, wherein the communication apparatus comprises at least one processor and one or more memories coupled to the at least one processor and storing programming instructions for execution by the at least one processor to:

receive a reference signal sent by a network device, wherein the reference signal has an association relationship with a weight matrix and a channel between the network device and the communication apparatus, wherein the weight matrix is determined at least based on a predetermined factor associated with transmit power of the network device, and wherein a quantity of rows or columns of the weight matrix is N, wherein N is a positive integer less than or equal to a quantity of receive ports of the communication apparatus; and determine an estimation result of the weight matrix based on the reference signal, wherein:

the estimation result of the weight matrix is used by the communication apparatus to perform signal detection on a data signal received by the communication apparatus from the network device; or the estimation result of the weight matrix is used by the communication apparatus to precode a data signal sent by the communication apparatus to the network device.

20. The communication apparatus according to claim 19, wherein when the estimation result of the weight matrix is used by the communication apparatus to perform signal detection on a data signal received by the communication apparatus from the network device, the one or more memories store the programming instructions for execution by the at least one processor to:

multiply the estimation result of the weight matrix by the data signal received by the communication apparatus from the network device.

* * * * *